G. H. ADAM.
SAW GUARD.
APPLICATION FILED SEPT. 25, 1917.
1,282,165.
Patented Oct. 22, 1918.
2 SHEETS—SHEET 1.
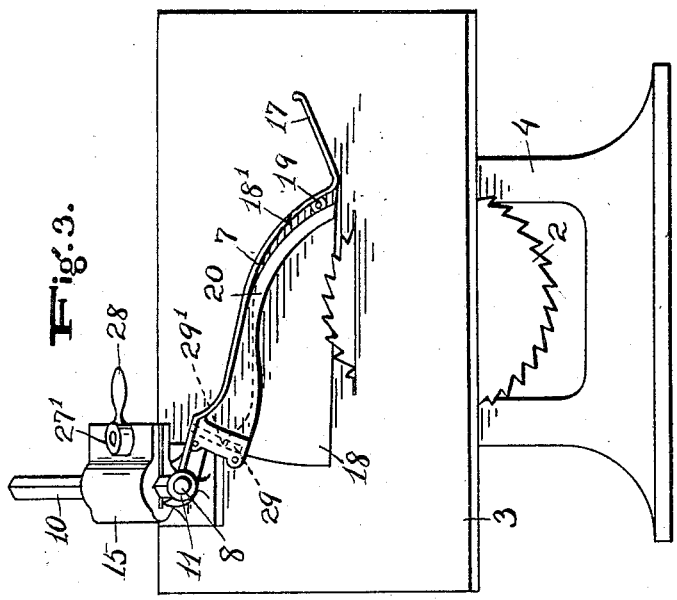
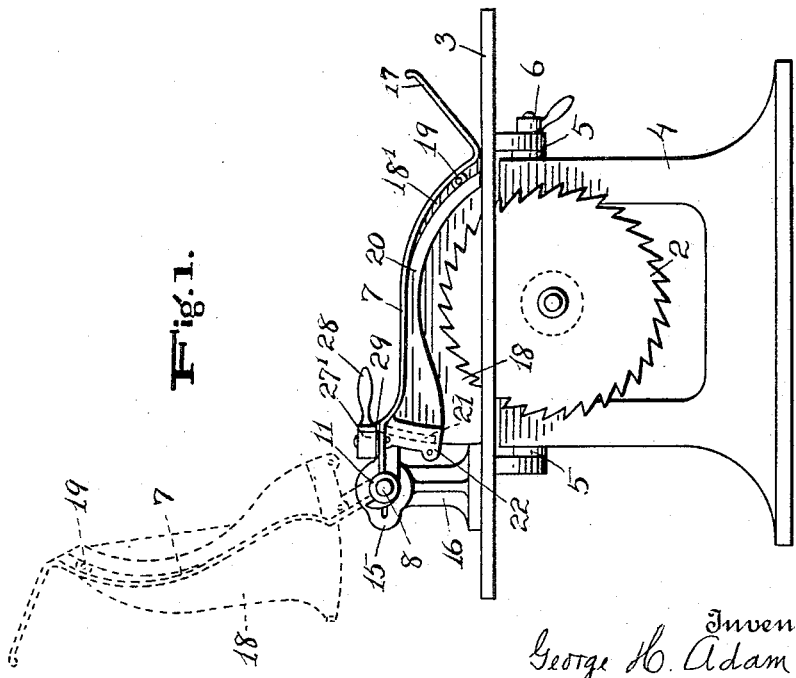
Inventor
George H. Adam
By E. W. Anderson & Son
his Attorneys G. H. ADAM.
SAW GUARD.
APPLICATION FILED SEPT. 25, 1917.
1,282,165.
Patented Oct. 22, 1918.
2 SHEETS—SHEET 2.
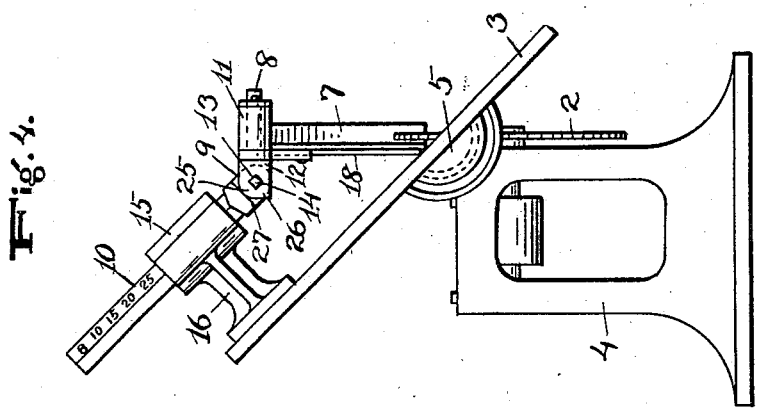
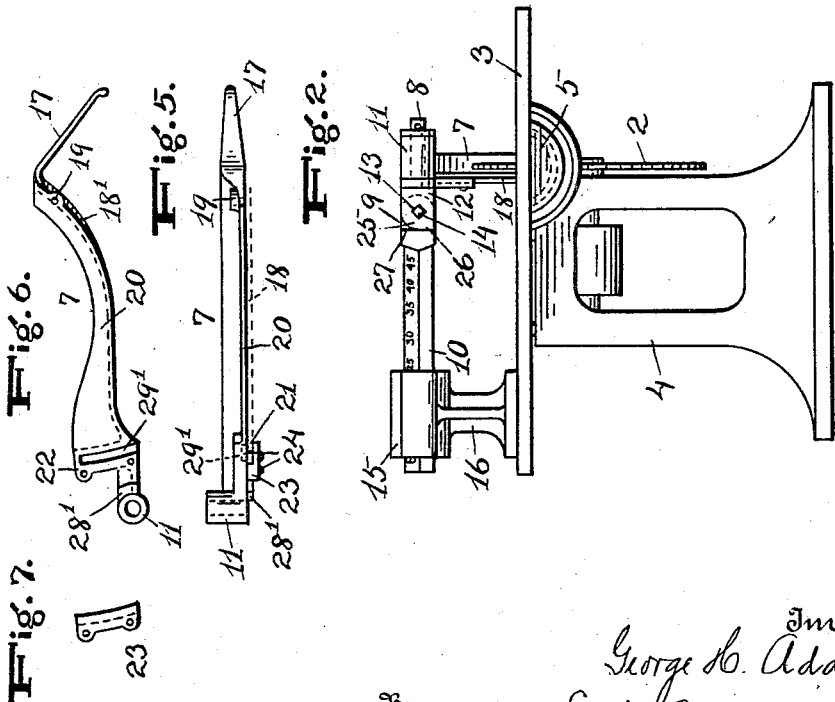
Inventor
George H. Adam.
By E. W. Anderson & Son
his Attorneys.

UNITED STATES PATENT OFFICE.

GEORGE H. ADAM, OF CINCINNATI, OHIO.

SAW-GUARD.

1,282,165. Specification of Letters Patent. Patented Oct. 22, 1918.

Application filed September 25, 1917. Serial No. 193,111.

*To all whom it may concern:*

Be it known that I, GEORGE H. ADAM, a citizen of the United States, resident of Cincinnati, in the county of Hamilton and State of Ohio, have made a certain new and useful Invention in Saw-Guards; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a side view of the guard with the table level.

Fig. 2 is an end view of the same.

Fig. 3 is a side view with the table tilted.

Fig. 4 is an end view with the table tilted.

Fig. 5 is a detail plan view of the top guard.

Fig. 6 is a detail side view of the same bottom side up.

Fig. 7 is a detail side view of the rabbeted piece.

The invention has relation to guards for rotary or buzz-saws, having for its object certain improvements upon the device of my Patent No. 1,101,515, dated June 30, 1914, with a view to providing a guard attachable directly to the saw table and equally useful when the saw table is level or when it is tilted to a high angle.

Other objects and advantages will hereinafter appear.

The invention consists in the novel construction and combinations of parts as hereinafter set forth.

In the accompanying drawings illustrating the invention, the numeral 2 designates the saw, 3, the saw table, and 4, the supporting frame, the saw located at one side of the table, so that the table may be tilted in the usual manner upon its pivots 5 by adjustment of the clamp nut 6.

A standard 16 is rigidly secured to the saw table, to tilt therewith, and is provided with a split clamp 15, the normally horizontal aperture of which is engaged slidably by a rod 10, preferably of prismatic form, this rod having an end extension 9. A universal joint member 12 laps the said end extension, and is provided with a perforation 13 engaged by a horizontal pivot bolt 14 connecting joint member and rod, said bolt located in a vertical plane adjacent to one lateral circumferential edge of the saw, the outer end of said member having, through pivot bolt 8, connection with the rear end or hub 11 of the top guard 7, said bolt 8 at right-angles to the bolt 14.

The top guard is preferably horizontal over the rear portion of the saw and has a downward curvature concentric with the saw over the forward portion of the same, terminating in an upturned or cam end 17, normally resting upon the saw table.

The front side of the saw is not inclosed, being open to facilitate inspection and escape of the saw dust or other waste which ordinarily has a tendency to bank up in a guard inclosed upon both sides or at front and back. To further facilitate the escape of the saw dust, the downwardly curved forward portion of the top guard is outwardly beveled, or upwardly from back to front, as shown at 18'.

The rear side of the saw is shielded by a lateral guard 18, pivoted at its forward end at 19 to the front end of the top guard, the upper part of the lateral guard lapping the downwardly extending flange 20 of the top guard and the rear edge of the lateral guard working in a guide groove 21 of the top guard. This rear portion of the lateral guard is concentric with its forward pivot, as is the guide groove in which it works, and said groove is preferably furnished by a downward extension 22 of the top guard, (said extension having its forward inner lateral face in the same plane as that of the flange 20), and a rabbeted piece 23, bolted to the extension at 24. The member 12 is provided with an upper rounded corner 25, turning freely in contact with the end of the rod 10, the lower corner of said member being squared as shown at 26, and engaging the squared abutting end 27 of the rod 10, when the rod and the two joint members 10 and 12 and the pin 8 are all in alinement or horizontal, as shown in Fig. 2 of the drawings, the table being level.

In the operation of the device, the table being tilted to an angle, as shown in Fig. 4, and the work being passed into engagement with the saw, will first come in contact with the forward cam end of and raise the top guard upon its rear pivot as a center, the lateral guard at the same time falling upon its forward pivot as a center to make close contact with the table. In the adjustment of the table to angular position, the clamp members 15 are first released by operation of the nut 27 having a handle extension 28, the table being then tilted with the standard 16, the clamp and the rod 10 tilted therewith to the desired angle, said rod, the joint member 12 and the saw guard being manually adjusted to proper position, after which the nut 27 is tightened again.

In the adjustment of the saw table to high angles approaching and even to forty five degrees, the lateral guard will still automatically adjust itself and guard the saw in proper manner, said guard being in all cases raised upon its forward pivot by contact with the upper surface of the work.

The entire guard may be raised upon its rear pivot for inspection of the saw or of the work, the guard passing over beyond the vertical until the stop lug 28' thereof engages a stop lug upon the collar of the joint member 12 to retain the guard in raised position. The lateral guard is limited in its downward movement by the upper stop projections 29 thereof engaging the lower end of a groove 29' of the top guard said projection working in said groove, and the latter being concentric with the pivot 19.

I claim:—

1. In a saw guard, a normally horizontal tiltable saw table, a standard rigidly secured to said table, tiltable therewith and having a normally horizontal aperture, a rod slidable in said aperture, a universal joint member having horizontal pivotal connection with one end of said rod, the longitudinal axis of said pivotal connection located in a vertical plane adjacent to one circumferential lateral edge of the saw, and a top guard for the saw having at one end thereof horizontal pivotal connection with said member at right-angles to said pivotal connection of the member with said rod.

2. In a saw guard, a normally horizontal tiltable saw table, a standard rigidly secured to said table, tiltable therewith and having a normally horizontal aperture, a rod slidable in said aperture, a universal joint member having horizontal pivotal connection with one end of said rod, the longitudinal axis of said pivotal connection located in a vertical plane adjacent to one circumferential lateral edge of the saw, a top guard for the saw having at one end thereof horizontal pivotal connection with said member at right-angles to said pivotal connection of the member with said rod, and a lateral guard having forwardly thereof a pivotal connection with said top guard at the opposite side of the saw from the pivotal connection of the top guard with said member.

In testimony whereof I affix my signature in presence of two witnesses.

GEORGE H. ADAM.

Witnesses:
L. J. ADAM,
DAVID W. GABELEIN.

Copies of this patent may be obtained for five cents each, by addressing the "Commissioner of Patents, Washington, D. C."